United States Patent [19]

Sakano

[11] Patent Number: 4,969,417
[45] Date of Patent: Nov. 13, 1990

[54] CAGE FOR EXPERIMENTAL ANIMALS

[75] Inventor: Kazuhito Sakano, Toyama, Japan

[73] Assignee: Toyo Sangyo Kabushiki Kaisha, Toyama, Japan

[21] Appl. No.: 411,550

[22] Filed: Sep. 22, 1989

[30] Foreign Application Priority Data

Sep. 25, 1987 [JP] Japan .................. 62-241517

[51] Int. Cl.$^5$ .................................................. A01K 1/00
[52] U.S. Cl. ......................................... 119/15; 119/174
[58] Field of Search .......................... 119/1, 15, 17, 19

[56] References Cited

U.S. PATENT DOCUMENTS 4,337,726  7/1982  Czekajewski et al. ................ 119/1
4,448,150  5/1984  Catsimpoolas ........................ 119/15

FOREIGN PATENT DOCUMENTS 1926740  4/1978  Fed. Rep. of Germany ........ 119/15
2451775  11/1980  France ................................ 119/15
226752  9/1985  Poland ................................ 119/15

Primary Examiner—John Weiss
Attorney, Agent, or Firm—Flynn, Thiel, Boutell & Tanis

[57] ABSTRACT

A cage of experimental animals comprises a body, a position detection part to be assembled with the body and a cover for covering the body. The body has a cylindrical cover projected from a bottom thereof, a keeping space defined between a side wall of the body and the cylindrical cover for keeping experimental animals. The position detection part has a position detector at the circumferential surface thereof for detecting the behavioral movement of the animal.

9 Claims, 2 Drawing Sheets

CAGE FOR EXPERIMENTAL ANIMALS

BACKGROUND OF THE INVENTION

1. Field of the Invention

The present invention relates to a cage for experimental animals, such as mice, rats or hamsters, employing optical sensors to measure the action of the experimental animal.

2. Description of the Prior Art

In the medical and pharmaceutical fields, main affection of activity of medicines and an approximate result of a sudden poison are evaluated on the basis of observation of a wide range of symptoms or behavioral movement associated with experimental animals as a result of dosage of chemical and analogous chemicals which becomes the raw material of the medicines. Furthermore, a long term experiment is obligatory for the medicines and foods in view of safety thereof.

The behavioral movements of the experimental animals are deeply related with a neural system of the animals. The behavioral movement of the animals always includes movement in the form of walk. Observing the change of position of the behavioral movement of the experimental animal revealed one aspect of the experimental animals and infers the part of the function of the neural system from dosage of new medicine supplies. However, inasmuch as the experimental animals are very small such as the mice, and the rats, it is very difficult to observe the positional change of the behavioral movement of the experimental animals. Hence, it is difficult to observe visually the full particulars of the positional change of the experimental animals. The positional change means the behavioral movement of the experiment animals kept in a keeping cage such as rightward and leftward movements to turn the body thereof in the keeping cage. The keeping cage employed for measurement of positional change of the experiment animals is conventionally typically square shaped.

A prior art keeping cage is illustrated in FIG. 1. A square-shaped cage body 1 made of polycarbonate, stainless, or aluminum and a cover of metal net made of stainless wire. A mouse M as an experimental animal is kept in the cage body 1. Light-emitting diode LEDs 3 and light receiving transistors 4 functioning as a detector are respectively oppositely disposed in X-axis and Y-axis for detecting the positional change of the mouse M in the X-axis and Y-axis directions. The detector composed of the LEDs and the light receiving transistors 4 detects the X-axis direction and Y-axis direction to thereby issue an electric signal which is amplified by an amplifier (not shown) so that the positional change is automatically measured by numeration and analyzation per unit time.

However there is such a problem in prior art square shaped keeping cage that progress direction of the experiment animal is hindered by a side wall unless the keeping space is not so large, at the time the experiment animal behaves to change its position in the cage, to thereby restrict a continuous behavioral movement of experimental animal. As a result, the experiment animal repeats turning of directions physically without voluntary behavial movement, which is not affected by the behavioral movement thereof affected by the neural system caused by the dosage of the medicine. That is, the obstacle of the progress direction of the experimental animal causes a behavioral data to introduce an incorrect factor which results in achieving unideal cage.

SUMMARY OF THE INVENTION

The present invention has been made in view of the drawbacks of the prior art cage for experimental animals.

It is therefore a first object of the present invention to provide a cage for experimental animals capable of observing accurately the behavior of the experimental animal.

It is a second object of the present invention to provide a cage for experimental animals capable of effectively conducting an experiment in a limited small keeping space.

It is a third object of the present invention to provide a cage for experimental animals capable of obtaining a large amount of data.

To achieve the above objects of the present invention, a cage for experiment animals comprises a body of a cylindrical shape having a circular side wall, a cylindrical cover projected from a bottom thereof, a keeping space defined between the side wall and the cylindrical cover for keeping experimental animals, a position detection part assembled with the body, the position detection part having a cylindrical body projected from the center thereof and provided with a position detector at the circumferential surface thereof for detecting behavioral movement of the animals, and a cover made of a metal net and fit over the body for covering the body.

The above and other objects, features and advantages of the present invention will become more apparent from the following description taken in conjunction with the accompanying drawings.

DETAILED DESCRIPTION OF THE PREFERRED EMBODIMENT

Figure 1A:
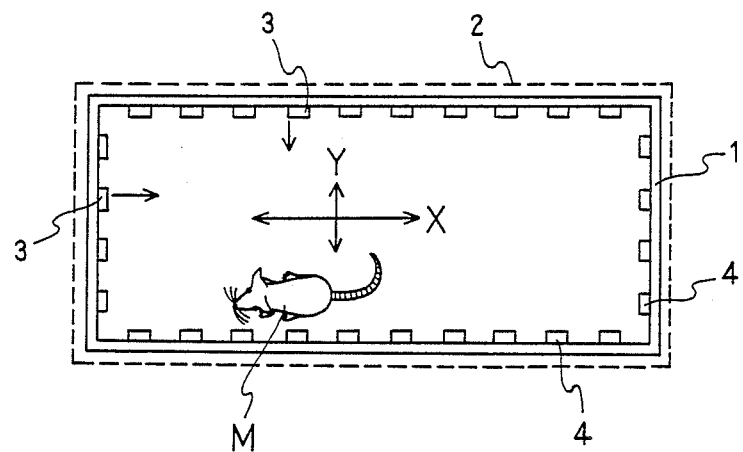
FIG. 1(a) is a plan view of a prior art cage for animals.
Figure 1B:
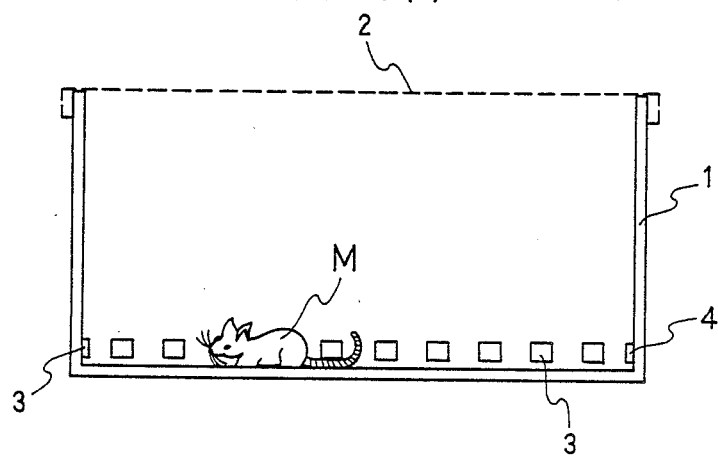
FIG. 1(b) is a side elevation of a prior art cage for animals.
Figure 2:
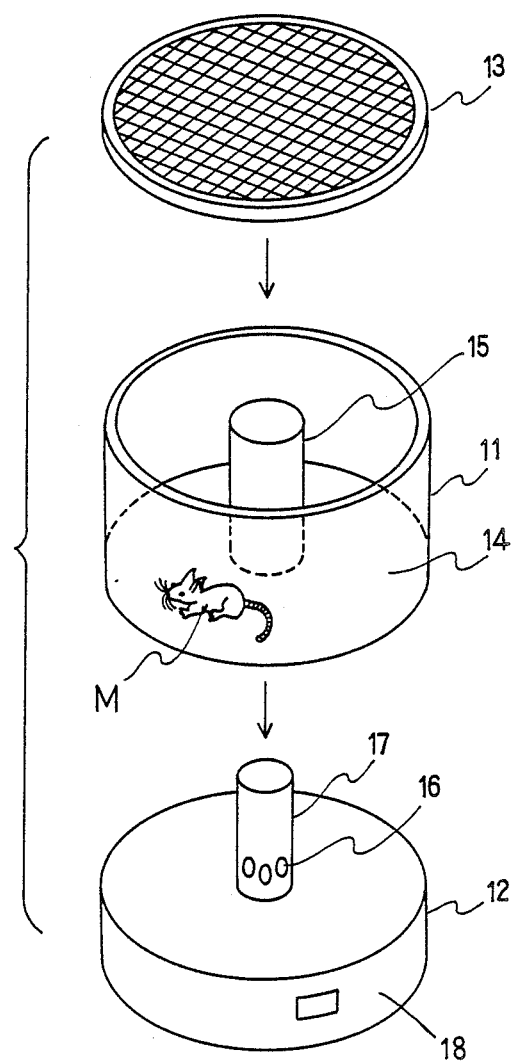
FIG. 2 is an exploded perspective view of a cage for animals according to a preferred embodiment of the present invention.
Figure 3:
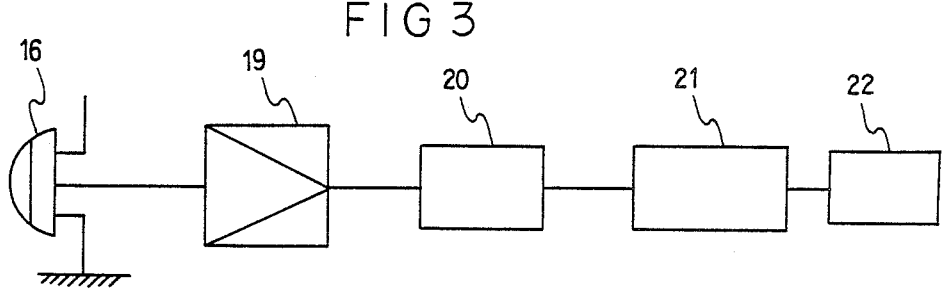
FIG. 3 is a block diagram of assistance in explaining a detection circuit employing an electric focusing type ultraviolet sensor.

A preferred embodiment of the cage for animals will be described with reference to FIGS. 2 and 3.

A cage for experiment animals comprises a body 11 of a cylindrical shape having a circular side wall, a cylindrical cover 15 projecting centrally from a bottom thereof, an annular keeping space 14 defined between the side wall and the cylindrical cover 15 for keeping experimental animals, a position detection part 12 assembled with the body 11, the position detection part 12 having an enlarged base portion 18 with a cylindrical hub 17 projecting upwardly from the center thereof and provided with a position detector 16 at the circumferential surface thereof for detecting behavioral movement of the animals; and a cover 13 made of a metal net and fit over the body 11 for covering the body 11. The body 11 fits downwardly on the part 12 so that hub 17 projects into the center cover 15.

The body 11 is circular in cross section, namely, has a circular side surface but may be oval in cross section.

The size of the space 14 can be freely determined by the size, kind, etc. of the experimental animal M. The body 11 is made of a material of light weight, low cost and preferably transparent plastics in view of visual points of the experimental animal M.

The position detector 16 may be any means capable of detecting the positional change such as a reflective photosensor, a transmission photosensor, a magnetic sensor, an ultrasonic sensor, an infrared sensor. The position detector 16 according to the present invention is preferably an infrared sensor, particularly, an infrared sensor of the electric focusing type for detecting the infrared rays having the wavelength characteristic corresponding to the temperature of the experimental animal M. The cylindrical cover 15 located at the center of the body 11 is preferably made of a material having a good permeability relative to the infrared rays such as a polyethylene resin or a silicone resin. A plurality of position detectors 16 are positioned circumferentially around the circumferential surface of the cylindrical body 17.

The position detector 16 will be described more in detail with reference to FIG. 3.

The positional change of the behavioral movement of the experimental animal M is detected by the infrared phtosensor 16 having a filter which passes infrared wavelengths. Upon detection of the positional change, a signal is issued which is amplified by an amplifier 19. The amplified signal is applied to a differential circuit 20, a reference time generation circuit 21 and changed to a detection signal 22 which is numerized and measured.

With the arrangement of the cage for experimental animals, inasmuch as the experimental animal M behaves in the keeping space and along the endless circular surface of the space, even if in a limited keeping space having a special morphology, it is possible to make the experimental animal M move spontaneously and continuously as if the experimental animal is in an infinite space. Furthermore, inasmuch as the annular keeping space is circular in cross section and hence endless, there is nothing to impede the behavioral movement of the experimental animal, although impeded due to the square space in the prior art cage, so that the experimental animal M can move continuously and spontaneously. As a result, it is possible to measure the influence, behavioral movement of the experimental animal M due to dosage of medicine supplies, and the positional change of the behavioral movement of the experimental animal M without being influenced by other factors. Still furthermore, it is possible to set the behavioral original position of the experimental animal M relative to an arbitrary position on the circumference of the circle of the cylindrical body 11. The original position is effective for measurement and makes it possible to carry out a long term experiment due to provision of installation of dosage of the medicines, feed, water, or an experiment of conditioned reflex due to provision of an electric stimulus plate, whereby a variety of data, such as number of passages on one fixed point among the infinite possible passages, can be prepared.

With such an arrangement of the cage of the present invention, it is possible to observe accurately the behavioral movement of the experimental animal, differing from the prior art square shaped cage due to elimination of incorrect data caused by the structure of the cage. It is also possible to effectively conduct an experiment in a limited small space which can be effectively utilized so that the cost for manufacturing thereof will be reduced. Accordingly, the present invention is remarkably utilized in the case of obtaining a large amount of data in medical experiments using animals.

What is claimed is:

1. A cage for laboratory animals, comprising:
   a main body including a bottom wall and an outer tubular side wall upstanding from said bottom wall along an outer peripheral edge thereof, said body also including an inner tubular wall projecting upwardly a substantial vertical extent from a central portion of said bottom wall, said inner and outer tubular walls being substantially concentric and defining radially therebetween and above said bottom wall an annular space for confining a laboratory animal, said annular space being circumferentially endless to permit the laboratory animal to move along an endless circular path;
   position detection means for using infrared energy radiated from the body of the laboratory animal to detect the position of the laboratory animal in said endless annular space, including a part projecting vertically into said inner tubular wall so as to be radially surrounded thereby, and sensor means mounted on said part for detecting infrared radiation in a range of wavelengths associated with the body temperature of the laboratory animal;
   said inner tubular wall being made from a material having a high permeability relative to said infrared radiation for permitting transfer of said radiation through said inner tubular wall to said sensor means; and
   a top cover removably supported on said main body for overlying and covering said endless annular space.

2. The cage according to claim 1, wherein said inner and outer tubular walls respectively comprise concentric inner and outer upright cylindrical walls which are radially spaced a substantial distance apart and define said endless annular space therebetween, said endless annular space being circumferentially free of obstructions.

3. The cage according to claim 1, wherein said sensor means includes a plurality of circumferentially spaced infrared sensors positioned at predetermined circumferential intervals on an outer peripheral surface of said part.

4. The cage according to claim 1, wherein said part projects upwardly into said inner tubular wall.

5. The cage according to claim 1, wherein said main body is made from a transparent plastics material.

6. The cage according to claim 1, wherein said top cover is a mesh-like screen.

7. A cage for laboratory animals, comprising:
   a main body including a bottom wall, an outer cylindrical side wall fixedly related to and projecting upwardly from said bottom wall, and an inner cylindrical side wall fixedly related to and projecting upwardly from said bottom wall, said inner and outer cylindrical side walls being substantially concentrically related with respect to one another and being radially spaced a substantial distance apart to define an unobstructed endless annular space therebetween for confinement of a laboratory animal, said outer cylindrical wall permitting visual observation of the laboratory animal in the annular space, and said inner cylindrical wall being made from a material having a high permeability relative to the infrared radiation associated with the body temperature of the laboratory animal; and position detection means for detecting the position of the laboratory animal in said endless annular space, including a support member positioned vertically within said inner cylindrical side wall so as to be radially surrounded thereby, and sensor means mounted on said support member for detecting the infrared radiation in the range of wavelengths associated with the body temperature of the laboratory animal disposed within the endless annular space.

8. A cage according to claim 7, wherein the position detection means includes an enlarged base which is positioned under the bottom wall of said main body, said support member projecting vertically upwardly from said enlarged base into the interior of said inner cylindrical side wall, and said sensor means including a plurality of infrared sensors mounted on said support member in circumferentially disposed relationship therearound.

9. A cage according to claim 8, wherein a mesh-screen top cover is mounted on said main body for overlying and covering the endless annular space.

* * * * *